United States Patent [19]

Speck

[11] 4,375,268
[45] Mar. 1, 1983

[54] AUTOMOTIVE VEHICLE BRACKET

[76] Inventor: Gordon C. Speck, 126 Port Republic Rd., Harrisonburg, Va. 22801

[21] Appl. No.: 236,157

[22] Filed: Jun. 5, 1981

[51] Int. Cl.$^3$ .......................... A47H 1/16; A47F 5/08
[52] U.S. Cl. ............................... 224/42.45 R; 211/62; 211/63; 211/64; 211/86; 211/87
[58] Field of Search ................ 224/42.45 R, 42.45 A, 224/311, 915, 913, 42.42 R; 220/85 H, 96; 248/311.2; 211/60 R, 62, 63, 64, 86, 87, 74, 75, 88; D7/70

[56] References Cited

U.S. PATENT DOCUMENTS

| | | | |
|---|---|---|---|
| D. 244,302 | 5/1977 | Bradley | D7/70 |
| 665,846 | 1/1901 | Alexander | 211/63 |
| 2,472,058 | 6/1949 | Artley | 211/86 X |
| 2,834,566 | 5/1958 | Bower | 224/42.45 R |
| 3,411,633 | 11/1968 | Magnuson | 211/87 X |
| 3,779,501 | 12/1973 | Zibell | 224/42.45 R X |
| 4,058,221 | 11/1977 | Elkins et al. | 211/64 X |

*Primary Examiner*—Steven M. Pollard

[57] ABSTRACT

A bracket for storing an elongated object, particularly an umbrella, within a closed vehicle. The bracket comprises a pair of cradle type hooks, for retaining the desired object, and a corresponding pair of mounting arms. The cradle type hooks being connected by cross bar member. The bracket is mounted within the vehicle by sliding the mounting arms between the trim molding and the headliner.

6 Claims, 4 Drawing Figures

U.S. Patent    Mar. 1, 1983    4,375,268
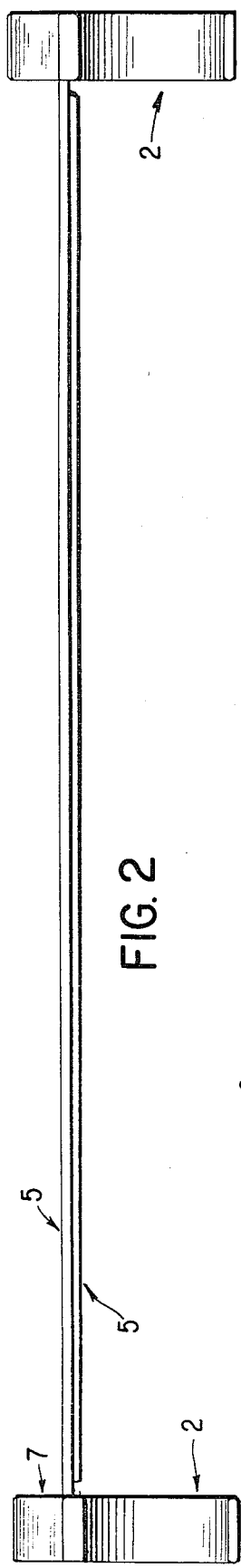
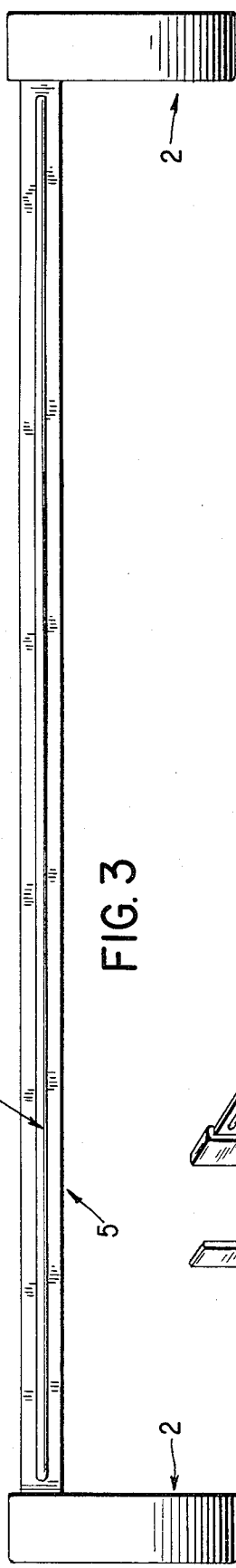
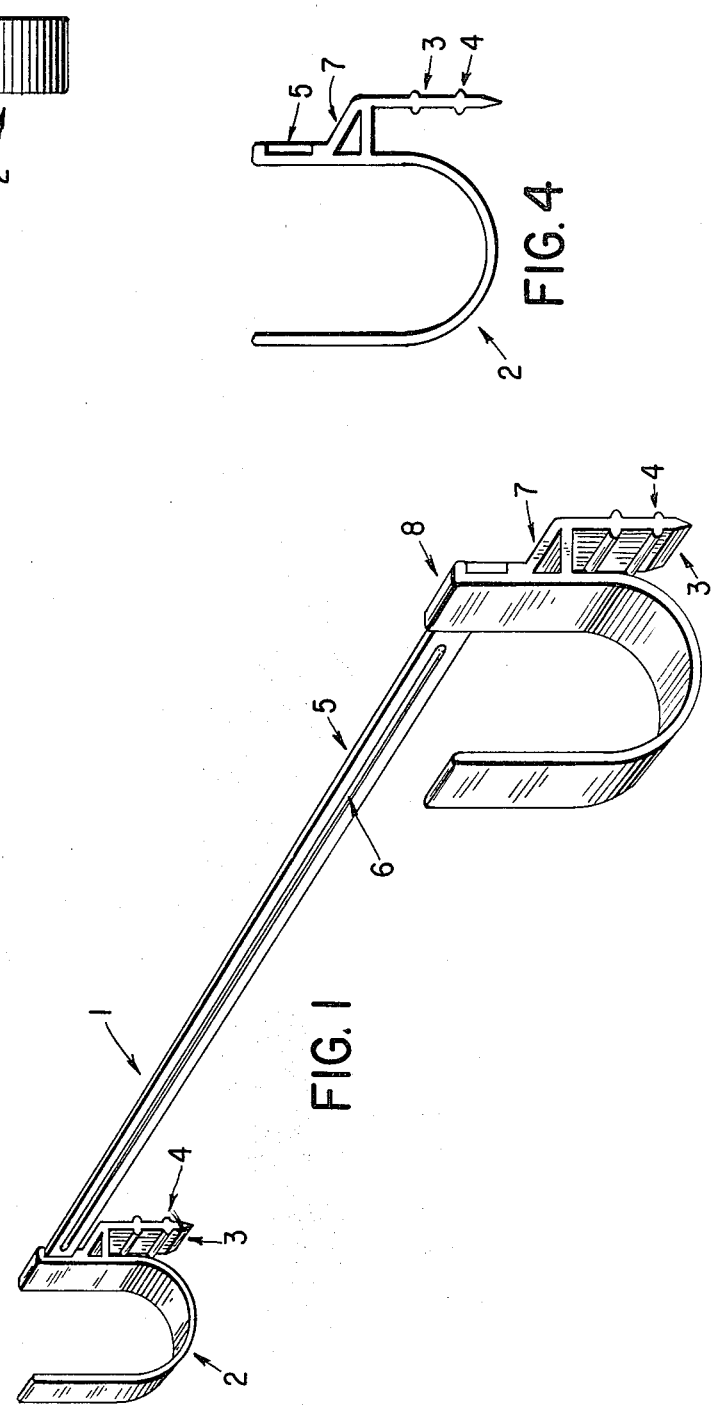
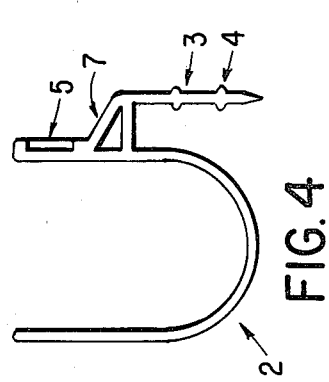

AUTOMOTIVE VEHICLE BRACKET

BACKGROUND OF THE INVENTION

This invention relates to a bracket assembly for storing an elongated object, particularly an umbrella, within a closed vehicle.

The carrying of an elongated object within a closed automotive vehicle has been inconvenient in the past because of the incompatability of the interior area of the vehicle and the shape of the elongated object. The object was normally in a location of interfere with the comfort and convenience of the passangers and/or driver.

SUMMARY OF THE INVENTION

It is thus an object of the invention to provide a storage means for an elongated object within a closed automotive vehicle.

It is further an object of the invention to provide a durable and inexpensive storage means which mounts within the closed vehicle without alteration of the interior thereof.

These and other objects and advantages of the invention will become readily apparent to those skilled in the art upon reading the following detailed description and claims and by referring to the accompanying drawings.

BRIEF DESCRIPTION OF THE DRAWINGS

FIG. 1 is a perspective view of the Automotive Vehicle Bracket.

FIG. 2 is a top view of the Automotive Vehicle Bracket.

FIG. 3 is a front view of the Automotive Vehicle Bracket.

FIG. 4 is a side elevational of the Automotive Vehicle Bracket.

DESCRIPTION OF THE PREFERRED EMBODIMENTS

FIG. 1 discloses the unitary bracket assembly 1 of the invention in perspective view. The bracket assembly 1 comprising a pair of cradle type hooks of U-shaped configuration, for retaining the desired object. Unitarily connected to each cradle type hook 2 is a mounting arm 3 spaced from and extending parallel to a leg of the U-shaped cradle type hook 2. The mounting arm 3 is connected to a leg of the U-shaped cradle type hook near a free end 8 of the leg and spaced therefrom by a bridge element 7. This relationship is clearly shown in FIGS. 1 and 4. Each mounting arm may have ridges or projections 4 to aid in the retention of the bracket upon installation.

The pair of cradle type hook members are unitarily retained in a symetrical relationship, with the arms 3 and the legs of each U-shaped cradle type hook parallel to each other. This retention is accomplished by a cross bar member 5 spacing each cradle type hook from the other and maintaining the symetrical relationship. The cross bar member may have a reinforcing rib 6 if necessary or desired. Note FIGS. 1, 2, and 3 of the drawings.

The bracket is installed by inserting the mounting arms 3 between the molding and the headliner of a vehicle. This molding is located above the door openings, thus placing the bracket in a convenient location. The molding is resilient and will exert a force upon the mounting arms. The ridges or projections on the mounting arms will aid in the retention of the bracket, after mounting, and present resistance to dislodging of the bracket in the event of jarring or vibration. No interior alterations are required for mounting of the device. The Automotive Vehicle Bracket can easily be removed and placed in another vehicle, leaving no marks or blemishes.

As will be apparent to persons skilled in the art, various modifications and adaptations of the above structure described will be readily apparent without departure from the scope and spirit of the invention, the scope of which is defined in the appended claims.

I claim:

1. A unitary bracket for storing an elongated object, particularly an umbrella, within a closed vehicle comprising: a pair of cradle type hook members of U-shaped configuration, each cradle type hook member having a mounting arm connected thereto, spaced from and extending parallel to a leg of said U-shaped cradle type hook member by a bridge element, said bridge element extending from said leg to said arm, the arm to be preferably retained between the headliner and the door opening molding of the vehicle upon installation, the cradle type hook members are retained in a spaced symetrical relationship, with the arms and legs of each U-shaped cradle type hook member parallel to each other, by a cross bar member.

2. The unitary bracket of claim 1 wherein said mounting arms have ridges from the leg to the arm, the arm to be preferrably retained between the headliner, and door opening molding of the vehicle upon installation, the cradle type hook members are retained in a spaced symetrical relationship, with the arms and legs of each U-shaped cradle type hook member parallel to each other, by a cross bar member.

3. The unitary bracket of claim 1 wherein said mounting arms have ridges to aid in the retention of said bracket after placing of said arms between the headliner and door opening molding.

4. The unitary bracket of claim 1 wherein said cross bar member has a reinforcing rib extending to aid in the retention of said bracket after insertion of said arms between the headliner and the door opening molding.

5. The unitary bracket of claim 1 wherein said cross bar member has a reinforcing rib extending parallel to said cross bar member.

6. The unitary bracket of claim 1 wherein the bridge element is connected to a leg of the U-shaped cradle type hook at a point between the free end of the leg and a point located $\frac{1}{3}$ the distance from said free end to the base of the leg.

* * * * *